Feb. 19, 1957 D. HEYER 2,781,689

MOTION PICTURE REPRODUCING APPARATUS

Original Filed July 19, 1945 9 Sheets-Sheet 1

INVENTOR.
DON HEYER,
BY Paul A. Weilein
ATTORNEY.

Feb. 19, 1957 D. HEYER 2,781,689

MOTION PICTURE REPRODUCING APPARATUS

Original Filed July 19, 1945 9 Sheets-Sheet 2

INVENTOR.
DON HEYER,
BY Paul A. Weilein
ATTORNEY.

INVENTOR.
DON HEYER,
BY Paul A. Weilein
ATTORNEY.

Feb. 19, 1957 D. HEYER 2,781,689

MOTION PICTURE REPRODUCING APPARATUS

Original Filed July 19, 1945 9 Sheets-Sheet 4

INVENTOR.

DON HEYER,

BY

ATTORNEY.

Feb. 19, 1957 D. HEYER 2,781,689

MOTION PICTURE REPRODUCING APPARATUS

Original Filed July 19, 1945 9 Sheets-Sheet 5

INVENTOR.
DON HEYER,
BY Paul A. Weilein
ATTORNEY.

Feb. 19, 1957 D. HEYER 2,781,689

MOTION PICTURE REPRODUCING APPARATUS

Original Filed July 19, 1945 9 Sheets-Sheet 6

INVENTOR.

DON HEYER,

BY Paul A. Weilein

ATTORNEY.

INVENTOR.
DON HEYER,
BY Paul A. Weilein
ATTORNEY.

Feb. 19, 1957 D. HEYER 2,781,689

MOTION PICTURE REPRODUCING APPARATUS

Original Filed July 19, 1945 9 Sheets-Sheet 8

INVENTOR.
DON HEYER,
BY Paul A. Weilein
ATTORNEY.

Feb. 19, 1957 D. HEYER 2,781,689

MOTION PICTURE REPRODUCING APPARATUS

Original Filed July 19, 1945 9 Sheets-Sheet 9

INVENTOR.

DON HEYER,

BY Paul A. Weilein

ATTORNEY.

United States Patent Office 2,781,689

Patented Feb. 19, 1957

2,781,689

MOTION PICTURE REPRODUCING APPARATUS

Don Heyer, Los Angeles, Calif., assignor to International Pneumatic Corporation, Los Angeles, Calif.

Original application July 19, 1945, Serial No. 603,873, now Patent No. 2,568,734, dated September 25, 1951. Divided and this application September 17, 1951, Serial No. 246,888

20 Claims. (Cl. 88—18.7)

This invention relates to apparatus for reproducing a visible or audible program, or both, from a previously made record. For example, the apparatus may reproduce a silent motion picture, or a picture with sound, or merely reproduce a sound record.

This application is a division of application, Serial No. 603,873, filed July 19, 1945, for Motion Picture Reproducing Apparatus which issued on September 25, 1951, as U. S. Letters Patent No. 2,568,734.

It is an object of this invention to provide an improved magazine for containing a flexible record carrying member arranged in the form of a continuous loop having superposed layers.

It is another object of this invention to provide a magazine for containing a flexible record member arranged as a continuous loop, having improved means for tensioning the loop.

It is another object of this invention to provide a magazine for enclosing a continuous flexible record carrying member, wherein the record may be reproduced without the need of any portion of the member extending outside of the magazine.

It is another object of this invention to provide a magazine such as described, in which a novel arrangement of tapered rollers have the triple function of contacting edges of the film coil so as to support the coil; of supporting the reels around which the coil is wound, and of increasing the speed of the film near the center of the coil while decreasing the speed of the film at the outer periphery of the coil in order that the film will be drawn from and delivered to the projection or reproduction zone in the magazine at the same surface speed.

It is a further object of this invention to provide a magazine such as described wherein the tapered rollers supporting the film coil are driven by contact with a stationary surface, such as a wall of the magazine, as the reels are rotated, thereby making it unnecessary to provide a power driven member for the rollers, with the result that a reduction in the number of parts and in the cost of the magazine as well as in the size thereof is brought about without sacrificing the capacity of the magazine for handling a comparatively large amount of film.

It is another object of this invention to provide a magazine containing a motion picture film with a sound track, said magazine having spaced apertures for projecting the picture and sound track therethrough.

It is still another object of this invention to provide a magazine mounting moving picture film, with a projection aperture and adapted for cooperation with gate and advancing mechanism having means for maintaining the film in projecting position.

This invention possesses many other advantages and has other objects which may be made more easily apparent from a consideration of several embodiments of the invention. For this purpose there are shown several forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Figures 26, 27:
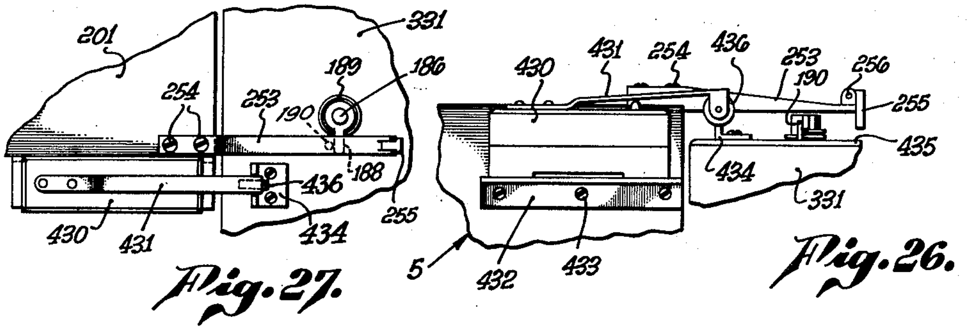
Figures 4, 5, 25:
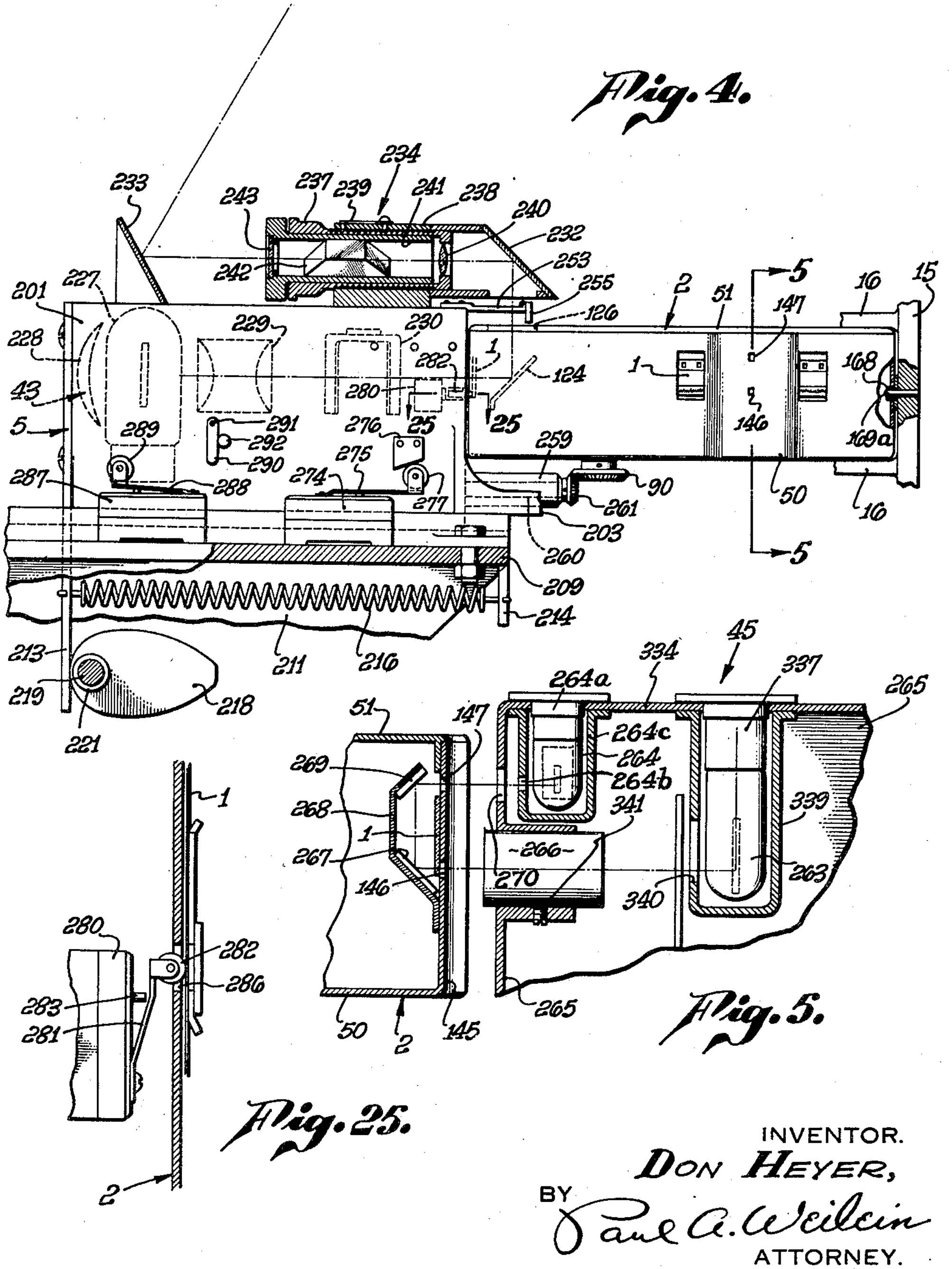
Figure 4 is a cross section on an enlarged scale taken as indicated by line 4—4 of Figure 2.
Figure 5 is a detail section taken as indicated by line 5—5 of Figure 4.
Figure 21:
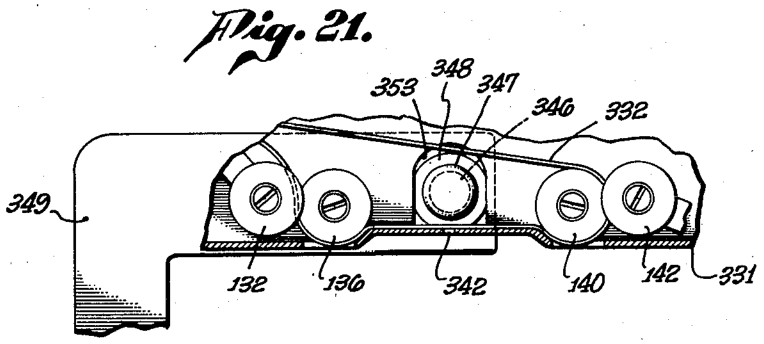
Figures 17, 18:
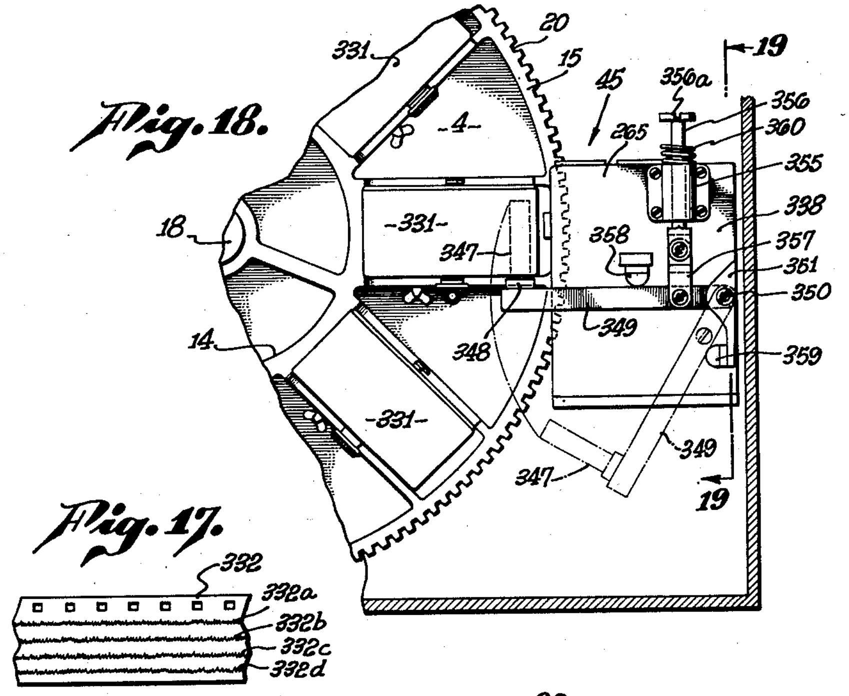
Figure 17 shows a fragment of a modified form of record carrying member.
Figure 18 is a fragmentary view similar to Figure 2, showing a modified form of magazine for use with a record member of the type shown in Figure 17.
Figures 19, 20:
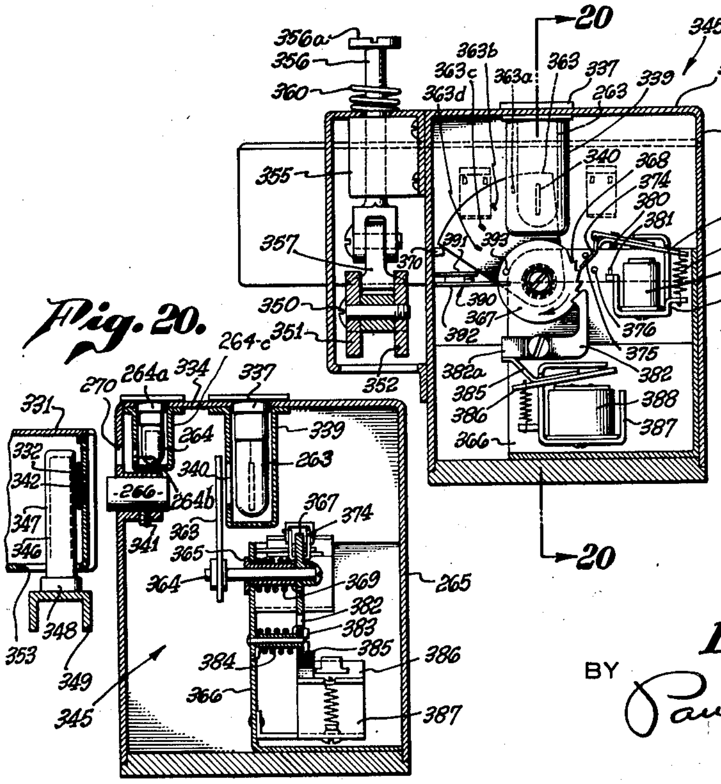
Figures 22, 23, 24:
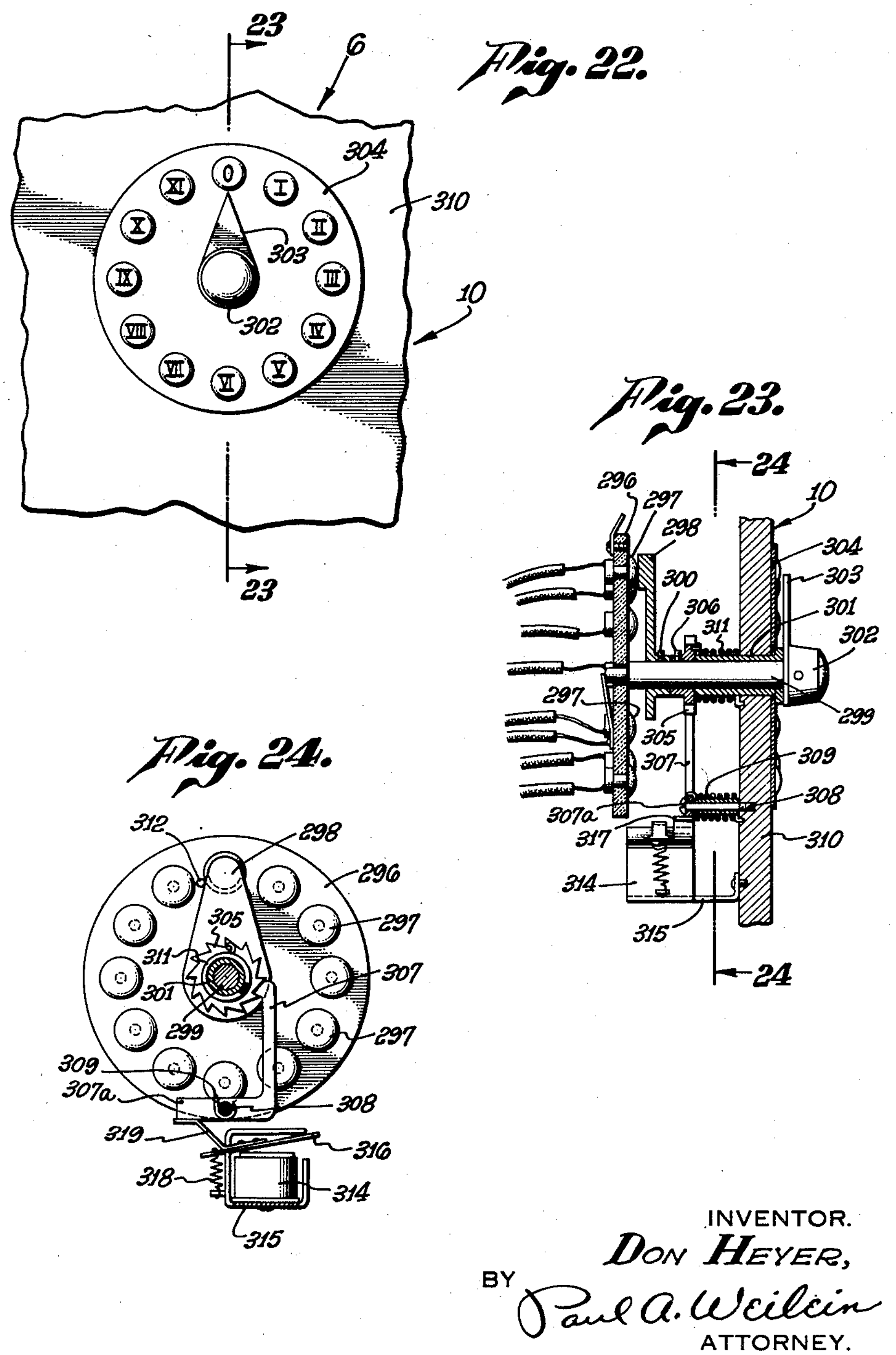

Figure 18-*a* is an elevation of a portion of the modified form of magazine;

Figure 19 is a cross section taken as indicated by line 19—19 of Figure 18;

Figure 20 is a cross section taken as indicated by line 20—20 of Figure 19;

Figure 21 is a fragmentary section of the modified form of magazine;

Figure 22 is an elevation of the subject selector used with the apparatus;

Figure 23 is a cross section taken as indicated by line 23—23 of Figure 22;

Figure 24 is a section taken as indicated by line 24—24 of Figure 23;

Figure 25 is a section taken as indicated by line 25—25 of Figure 4, showing one of the circuit control switches used in the apparatus;

Figure 26 is an elevation of another one of the control switches;

Figure 27 is a plan view of the structure of Figure 26; and

Figure 28:
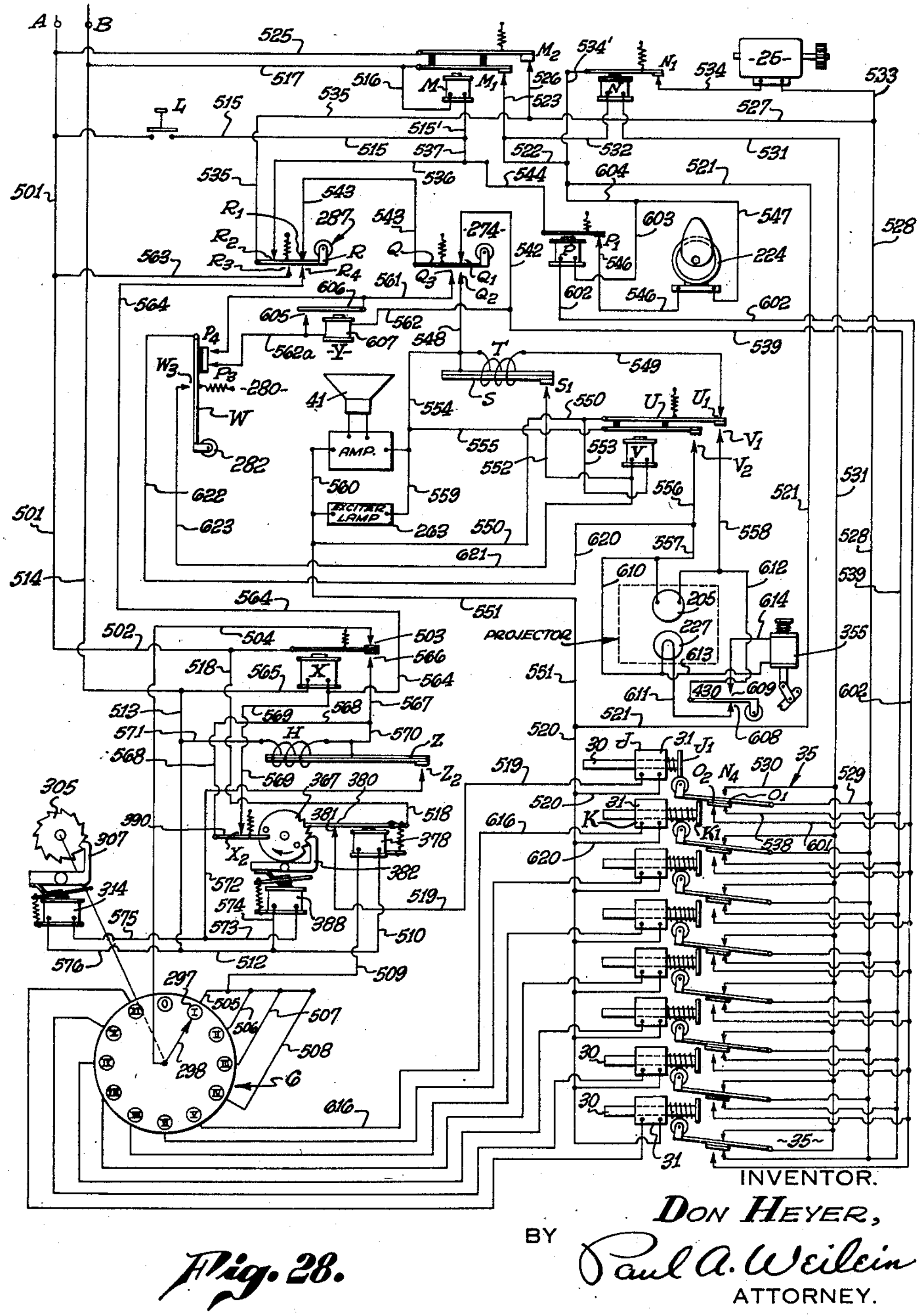

Figure 28 is a schematic wiring diagram of the apparatus.

Figures 6, 7:
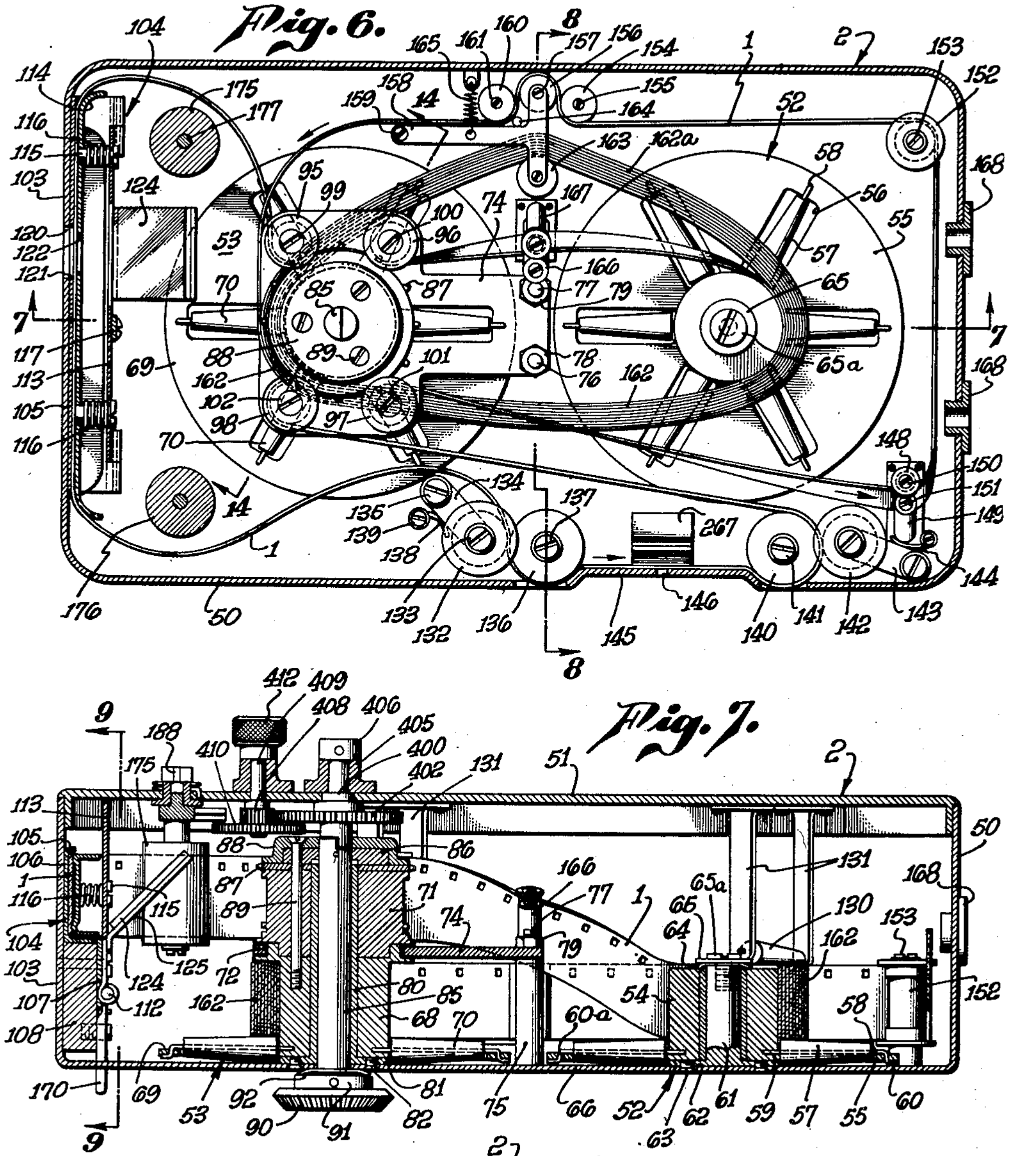
Figure 6 is a transverse sectional view on an enlarged scale of one form of record magazine utilized in the apparatus of Figure 1.
Figures 7 and 8 are sectional views taken as indicated by the correspondingly numbered lines of Figure 6.
Figure 8:
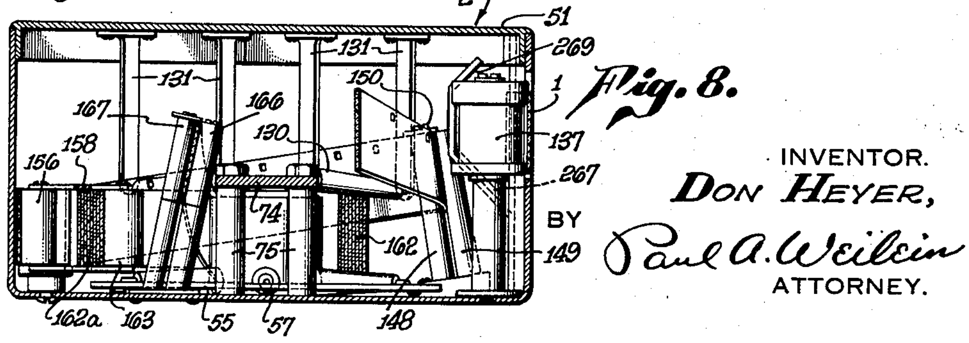

This invention contemplates the use of a continuous flexible record carrying member, such as shown at 1 in Figures 6 and 20, which is arranged and supported as a loop within a container or magazine 2 to cause the member 1 to move progressively past one or more openings in the magazine. A plurality of the magazines 2 are detachably mounted on a supporting member or carrier 4, which is arranged for movement to bring a selected magazine into operative position with respect to reproducing mechanism 5 in response to actuation of selector mechanism 6. Actuation of the selector mechanism causes energization of electrical means which, after causing the selected magazine to assume its operative position, serves to cause the reproducing mechanism to move to reproducing relation with respect to the selected magazine, and thereafter to reproduce the record therein. In some instances several records may be formed on a single record carrying member, in which case, the reproducing mechanism after moving to reproducing relation with respect to the magazine 2, further operates to reproduce a chosen one of such records, all in response to such actuation of the selector mechanism.

Figure 1:
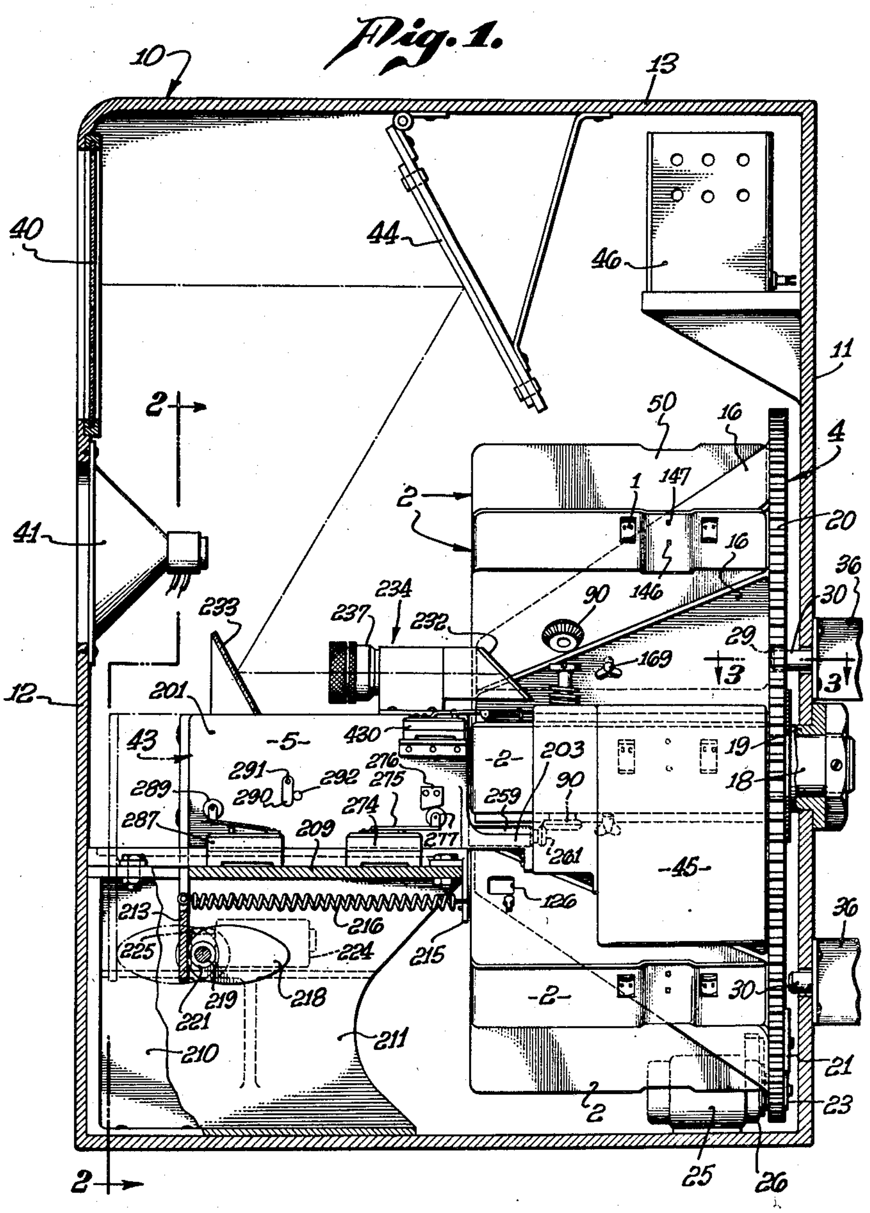
Figure 1 is a side elevation of apparatus, incorporating the features of the invention, and mounted in a cabinet, shown in section.
Figure 2:
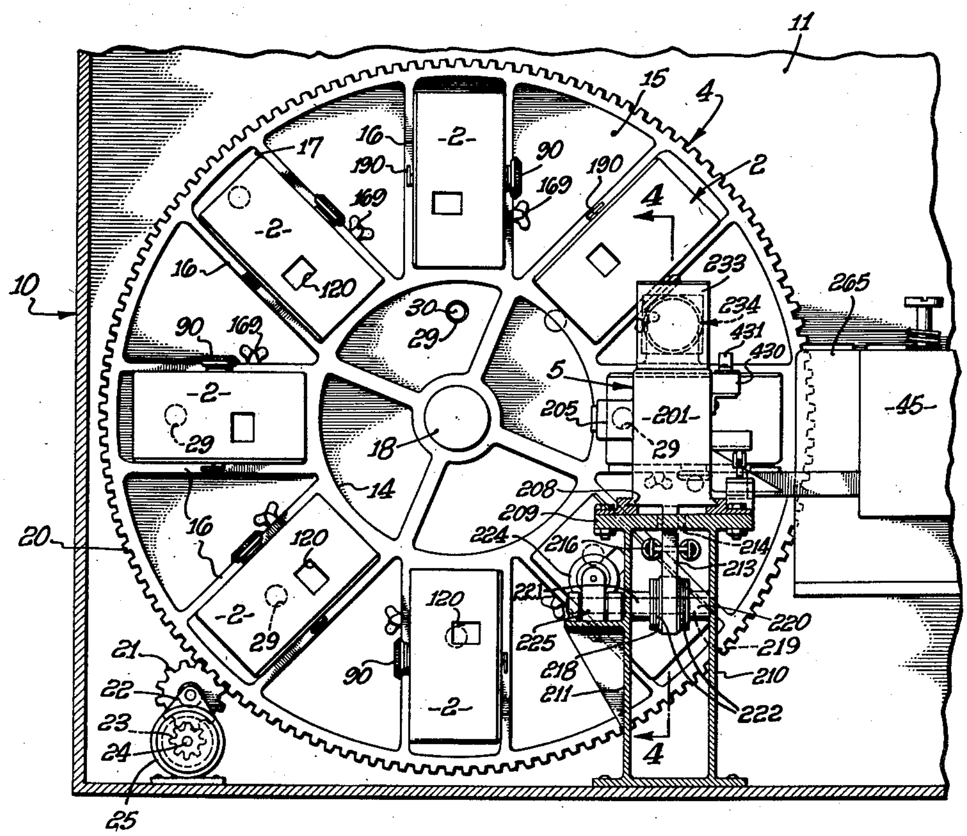
Figure 2 is a front elevation partly in section, taken as indicated by line 2—2 of Figure 1.

Referring to Figures 1 and 2, the entire apparatus is shown as mounted in a cabinet or housing 10. The selector mechanism 6, illustrated in elevation in Figure 22 and to be described later, may be mounted at any convenient place on the exterior of the cabinet 10, or remote therefrom.

The magazine carrier 4 is shown as rotatably supported by the back wall 11 of the cabinet 10 and comprises a central hub or tubular portion 14 formed integrally with a circular back flange or plate 15 and joined thereto by angularly spaced pairs of parallel ribs 16. Each pair of ribs 16 cooperates with the hub 14 to define a radially extending space 17 for accommodating a magazine 2. The magazines 2 are accurately positioned and held in their respective spaces 17 by means which will be described in connection with the details of the magazines.

A stub shaft 18 fixed in flange 15 rotatably supports the carrier 4 and fixes it against axial movement by engagement with a bearing sleeve 19 suitably fixed in the wall 11. The periphery of the flange 15 is provided with gear teeth 20 which are engaged by a drive gear 21 journalled in a bracket 22 and driven by a pinion 23 rotatably mounted on the shaft 24 of a small electric motor 25. The motor 25 drives pinion 23 through a slip clutch 26 of conventional design. The motor 25, upon energization by the selector mechanism 6 in a manner to be presently described, rotates the carrier 4 to a position corresponding to that chosen on the selector mechanism when means, now to be described, operate to deenergize the motor and stop rotation of the magazine. The slip clutch 26 is to allow the armature of the motor 25 to revolve a few turns after the magazine carrier 4 has been stopped, thus avoiding undue shock upon stopping the carrier.

For positioning the carrier 4, the back flange 15 is provided with a plurality of apertures 29 corresponding in number to the number of magazines 2 mounted by the carrier 4, each aperture 29 being in definite angular relation to its associated magazine. Furthermore, the apertures 29 are at different distances from the axis of the carrier 4 with respect to each other. A plurality of stop pins 30 are supported for axial movement through the cabinet wall 11 and are arranged to selectively engage the openings 29, thus positioning the carrier 4 to locate a chosen magazine for reproduction of the record therein.

Figure 3:
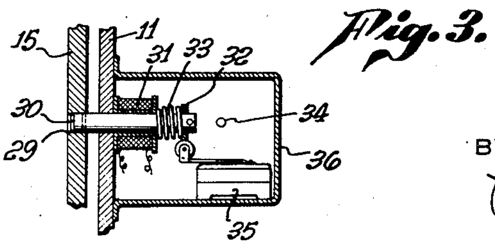
Figure 3 is a detail section, taken as indicated by line 3—3 of Figure 1.

As shown in Figure 3, each of the pins 30 extends through a solenoid 31 mounted on the outside of the wall 11 and a washer 32 is suitably mounted on the end of the pin opposite that adapted to engage the opening 29. A compression spring 33 confined between the washer 32 and the solenoid 31 urges the pin 30 to the right against a stop 34 and normally maintains the pin 30 clear of opening 29. When the solenoid 31 is energized the pin is resiliently urged against the flange 15 which is caused to rotate at the time the solenoid is energized. When the cooperating opening 29 is brought into alignment with the pin 30, the pin enters the opening 29 preventing further movement of the carrier 4. By appropriate choice of which of the solenoids 31 is energized, the position in which the carrier is stopped is controlled, thus placing a magazine 2 with the desired record in position for reproduction of the record.

A conventional spring actuated switch 35 is associated with each stop pin 30 and is arranged to be operated by movement of the pin. These switches 35 are of the type having normally open and normally closed contacts. When the pin 30 is in its normal position, one circuit is closed; and the other open. When the pin 30 is in engagement with the opening 29, the one circuit is opened and the other circuit closed. These circuits control the operation of the reproducing apparatus.

The solenoids 31 and switches 35 are about the axis of the shaft 18 and are enclosed by detachable covers 36.

The cabinet 10 and the apparatus therein, shown in Figures 1 and 2, is for reproducing records in the form of transparent film such as conventional motion picture film, and may reproduce pictures or sound, or both. Thus, a translucent viewing screen 40 for the pictures is provided in the upper part of the front wall 12 of the cabinet 10 and a conventional loud speaker 41 is provided below the screen. The picture image is transmitted from the projector 43 carried by the reproducer 5 (see Figure 4) to a reflector 44 adjustably mounted on the top 13 of cabinet 10. The reproducer 5 also includes sound pick-up apparatus generally indicated by 45 (Figure 2) for actuation by the record, the sound impulses being transmitted therefrom to an amplifier which may be enclosed in a casing 46 and thence to a speaker 41 by suitable leads (not shown).

Before describing the projector mechanism 43, the film magazine 2 will be described, for which purpose attention is directed to Figures 6–15 inclusive. As clearly shown in Figures 6, 7 and 8 the magazine 2 comprises a generally rectangular container 50, having one side, which is uppermost when the magazine is in reproducing position, closed by a detachable cover 51. The film 1 is arranged within the magazine 2 as a loop formed of superposed convolutions of the film and is supported for movement so that the film winds from one side of the loop, intercepts the light beam from the projector lamp and the light beam from the exciter lamp of the sound system, and returns to the other side of the loop in a continuous manner. An important feature of the arrangement is that the film is at no time required to pass outside of the magazine 2, the beam from the lamps passing into the magazine, through the film and thence to the remainder of the projecting or sound system. In this way movement of the magazine into and out of operating position is facilitated.

The film 1 is carried by a pair of reels or spools 52 and 53, rotatably mounted in the container 50. Reel 52 comprises a hub 54 suitably secured to a large annular flange or disc 55 having a plurality of radial slots 56 for accommodating tapered rollers 57. Each of the rollers 57 is rotatably mounted on an axle 58. Axle 58 is mounted at one end in a hole 59 in the hub 54, and at its other end by a bent portion 60 extending through a hole 60–*a* in the flange 55 near its periphery. The hub 54 is mounted on a stub shaft 61, which has a flange 62. Screws 63 passing through the flange 62 serve to secure the shaft in place. A spring washer 64 engages the top of the hub 54 and is held in place by a flat washer 65 and a screw 65–*a* threaded into the shaft 61.

The rollers 57 have their large ends adjacent the hub 54 and the parts are so proportioned that these large ends contact the bottom 66 of the magazine, the spring washer 64 urging them into frictional engagement with the bottom. Thus, as the reel 52 revolves, the rollers 57 are caused to rotate about their axes.

The companion reel 53 has a hub 68 with a flange 69 carrying tapered rollers 70, engaging the magazine bottom 66, similar to reel 52. An extension 71 is provided above the hub 68, and cooperates with the hub 68 to provide an annular groove 72 for receiving and supporting one end of a plate 74. The other end of the plate 74 is supported by a pair of spacers 75 mounted on threaded rods 76 and 77, provided with nuts 78 and 79.

It should be noted that the tapered rollers 57 and 70 in being rotated about their axes as the two reels 52 and 53 are rotated, tend to drive the bulk of the film coil bodily. As the peripheral speed of the film on the outer periphery of the coil and that on the inner periphery of the coil should be equal in order that a constant amount of film be maintained on the coil, it is necessary that the rotational speed of the outer periphery be less than the rotational speed of the inner periphery. The tapered rollers 57 and 70 provide for this desired speed differential in that they increase the speed of the film near the center of the coil and decrease it at the outer periphery. Accordingly, the film is drawn from and delivered to the reproduction or projection zone in the magazine at the same surface speed.

In driving the tapered rollers 57 and 70 by having them contact the magazine bottom 66, a power driven member such as heretofore provided in this art is eliminated with consequent reduction in the number of parts and the cost of the magazine. This makes it possible to make a smaller and more compact magazine without loss of film capacity.

The hub 68 and extension 71 are rotatably mounted on a tubular stub shaft 80 having a flange 81 engaged by screws 82 for securing the shaft to the bottom 66 of the magazine 2. A drive shaft 85 is rotatably mounted in the stub shaft 80 and has a collar 86 secured to its upper end. A film driving sprocket 87 is interposed between the collar 86 and the hub extension 71. A recessed cap 88 is superimposed over the collar 86 and sprocket 87. A plurality of long counter sunk head screws 89 extending from the cap 88 through the collar 86, sprocket 87 and hub extension 71 and threaded into the hub 68, secure these parts in assembled relationship, as well as for rotation with the shaft 85. The upper end of shaft 85 is provided with coupling means 85–*a* for engaging a cooperating coupling 85–*b* on a stub shaft 400 of the claw mechanism 401 for advancing the film 1, which will be described shortly.

A bevel gear 90 having a hub 91 is fixed on the lower end of the shaft 85, a spring washer 92 being interposed between the hub 91 and the magazine bottom 66. This prevents axial play between the shaft 85 with its attached parts and the magazine as well as urging the large end of the rollers 70 into driving engagement with the magazine bottom 66.

Figures 14, 15:
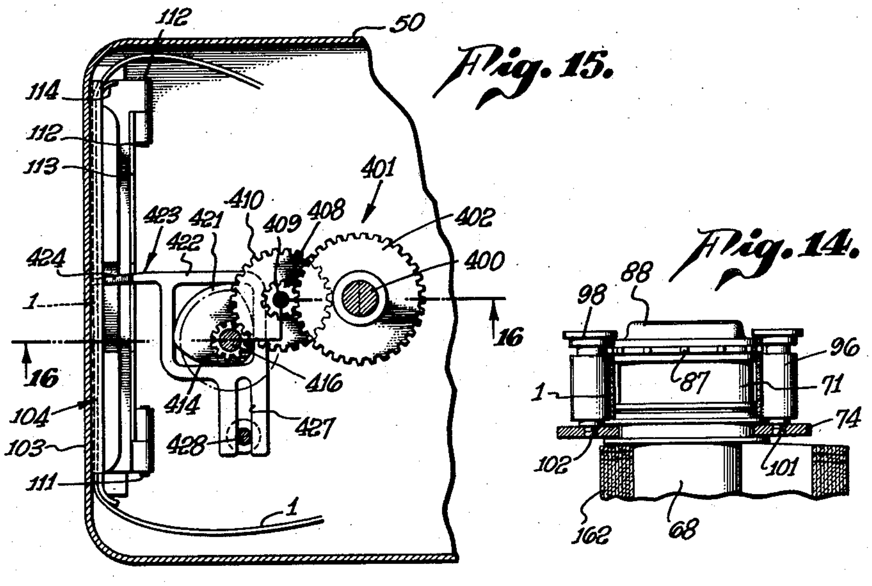
Figure 14 is a detail section taken on line 14—14 of Figure 6.
Figure 15 is a plan view of the record carrying member advancing mechanism.

Film guide rollers 95, 96, 97 and 98 are rotatably mounted on the plate 74, as by shoulder screws 99, 100, 101, and 102 which thread into the plate (see Figures 6 and 14).

The film tensioning mechanism generally indicated by 104, is mounted on one end wall as 103 of the magazine 50 (see Figures 6, 7, 10 and 11). This mechanism comprises a frame 105 having a channel shaped upper portion 106 for slidably accommodating the film 1 and an offset lower portion 107, supported on a spacer 108 secured on the end wall 103. The frame 105 is secured to the wall 103 by screws 109 which engage the slots 110 in the frame portion 107. Thus, the frame 105 can be adjusted lengthwise of the film 1.

The opposite ends of the lower frame portion 107 are arranged to mount the hinge pins 111 and 112 which pivotally support the pressure plate 113. The film gate 114 is attached to the plate 113 for movement toward and away therefrom by a pair of screws 115, compression spring 116 confined between the gate 114 and plate 113 serving to urge the film gate against the film 1. A flat spring 117 attached to the spacer 108 by a screw 118 maintains pressure against the plate 113. This assembly is similar in construction and function to the film gate usually provided for conventional motion picture projectors.

An aperture 120 is provided in the front magazine wall 103 in registry with openings 121 and 122 in the frame 105 and film gate 114 for passing a light beam through the picture portion of the film 1. This beam of light is emitted by a suitable source to be described presently, in connection with the reproducing mechanism 5, and passes through openings 120, 121 and 122, film 1 and a suitable opening 123 in pressure plate 113 onto an inclined reflector 124 (Figures 6, 7, 9 and 10). This reflector 124 is supported by a bracket 125 attached to the lower frame extension 107 and serves to reflect the light beam through an opening 126 in the cover 51 of the magazine 2 (Fig. 12) where it is received by another light transmitting element, also to be described in connection with the reproducing mechanism, and transmitted to the viewing screen 40.

It has been found that the most desirable position in which to operate a continuous film coil is with the width of the film vertically disposed. The film magazine 2 is arranged to operate the film 1 in such position as clearly shown in Fig. 7, which is the operative position of the magazine. However, since the magazine 2 is mounted in the rotatable carrier 4, the magazine may be other side up as regards Figure 7 or at any one of several intermediate positions. To support the film 1 in different positions of the magazine 2 as well as to guide it to and from the film tensioning mechanism 104, a number of rollers are provided in the magazine 2. For this purpose, a plurality of tapered rollers 130 are provided for cooperating with the tapered rollers 57 of the film reel 52 to confine the film (see Figures 7 and 8). These rollers 130 are rotatably supported on inclined axes by supports 131 depending from the cover 51.

A series of film tensioning rollers are provided in the container 50 adjacent one side thereof (see Figure 6) and include a flanged tensioning roller 132 rotatably mounted by a shoulder screw 133, on an arm 134 pivotally supported by a pivot screw 135. The roller 132 is urged toward a cooperating roller 136 which is rotatably mounted on a shoulder screw 137, by a flat spring 138 secured at one end as by a screw 139.

A roller 140 similar to roller 136 and spaced laterally therefrom is also rotatably mounted on a shoulder screw 141 and cooperates with a tensioning roller 142 rotatably mounted on a pivoted arm 143. A flat spring 144 serves to urge arm 143 to cause roller 142 to approach roller 140. Between the rollers 136 and 140 the wall of the container 50 is pressed inwardly to form a raised plane surface 145 having a pair of apertures 146 and 147 (see Figure 5) for transmitting a light beam from an exciter lamp through the sound track on the film 1 into the magazine 2, and thence from the interior of the magazine 2 to an appropriate transducing apparatus 45.

The rollers 132 and 136, and 140 and 142 confine the film 1 between them and cooperate to tension it over the table 145, to maintain it in contact with the surface as it advances, and prevent flutter of the film incident to the film advancing mechanism.

As clearly shown in Figure 6, the film 1 passes from the tensioning means 104, between rollers 132 and 136, over the table 145, between rollers 140 and 142, to and about roller 98, thence in contact with the sprocket 88 to roller 97 and downwardly to rollers 148 and 149 which are respectively rotatably mounted on screws 150 and 151. From between rollers 148 and 149 the film passes about a roller 152 mounted on a screw 153, thence to a roller 154 supported on a screw 155 secured in the bottom 66 of the magazine 2, over a roller 156 rotatably mounted by screw 157 on a frame 158 pivotally mounted by a screw 159 on the magazine. From the roller 156 the film passes under the roller 160 rotatably mounted by a screw 161 and thence to the periphery of the film coil 162 adjacent the reel 53.

The film coil 162 is formed by the aid of the reels 52 and 53, the upper reach 162–*a* of the coil 162 (Fig. 6) being supported between the reels by a roller 163 rotatably carried by the frame 158. The frame 158 is normally maintained against a stop pin 164, by a tension spring 165. This frame 158 acts to control the feeding of the film to the gate mechanism and operates in the following manner.

In a film coil of the type under consideration where the film is continuously wound and unwound, there must be continuous slippage between the convolutions of the coil since the film is wound for example on the outside of the coil and unwound from the inside, and the inside and outside of the coil due to the thickness of the coil would otherwise move at different speeds. If for any reason such as atmospheric conditions, or oil on the film, improper sliding between the film convolutions or other disturbing conditions occur, tension at once increases in the film as it is wound on the coil 162, which by acting on the roller 156 swings the frame 158 downwardly against the force of the spring 165, together with the roller 163, thus loosening the coil 162. The spring 165, by maintaining the frame 158 against stop pin 164 serves to maintain normal tension in the film coil 162. This tension should be just enough to wind the outer convolution on the coil without effecting the operation of the other convolutions.

Film is a very fragile material and will not withstand much tension; it is thus very important that it feed freely from the coil to the gate mechanism. Further, if the outer convolution begins to tighten or bind, a progressive tightening or snubbing effect occurs, which puts great tension on the innermost convolution. It is thus very important to properly regulate the tension of the outermost convolution. It has been found that the most satisfactory way to control the tension of film feeding from the inside of a coil, as in the present case, is by controlling the film tension as the film is fed back to the outside of the coil.

From the inside of coil 162 adjacent reel 52, the film is fed between a pair of inclined rollers 166 and 167 rotatably mounted on the magazine bottom 66, to roller 96 over the sprocket 88 and about the roller 99 to the gate mechanism 104.

As a means of securing each magazine 2 to the magazine carrier 4, each magazine case 50 is provided with a pair of dowel bushings 168 in its rear wall (Figure 6) adapted to engage dowel pins 169–*a* in the flange 15 of the carrier 4 (see Fig. 4) which serve to accurately position the magazine 2 in the space defined by the hub 14 of the carrier and the ribs 16. A pressure screw 169 threaded through one rib 16 of each pair clamps the magazine 2 against the other rib of the pair (see Fig. 2).

It is necessary that a suitable amount of free film in the form of loops be provided at all times between the projector 43 and the coil 162 to insure correct operation of the apparatus. For this purpose, mechanism 174 (Fig. 10) is provided to reform or reset such loops as an incident to each operation of the machine.

By such mechanism, if the film loop at either the entrant or emergent side of the gate mechanism 104 changes in relative position due to such causes as improper engagement of the claw mechanism 401 which advances the film through the gate (and to be described presently) or improper operation of the coil driving mechanism, these loops are properly formed or reset prior to each cycle of reproduction.

For instance, if the claw should fail to engage the first sprocket hole upon starting a cycle of reproduction and should lose the space to the next hole, or if a similar loss should occur due to improper engagement of the gearing driving the film coil (also to be described in connection with the projector 43), satisfactory operation of the film would not be adversely effected. However, after several such occurrences what is known as "losing the loop" will occur and satisfactory operation will not longer be possible. Thus, if the loops are reformed before each cycle of reproduction, such an occurrence will be avoided and the need of servicing of the machine, particularly undesirable in an automatic apparatus, will be obviated. Furthermore, it is desirable that means be provided for properly framing the film image on the screen after installation of a new film in a magazine.

Figure 9:
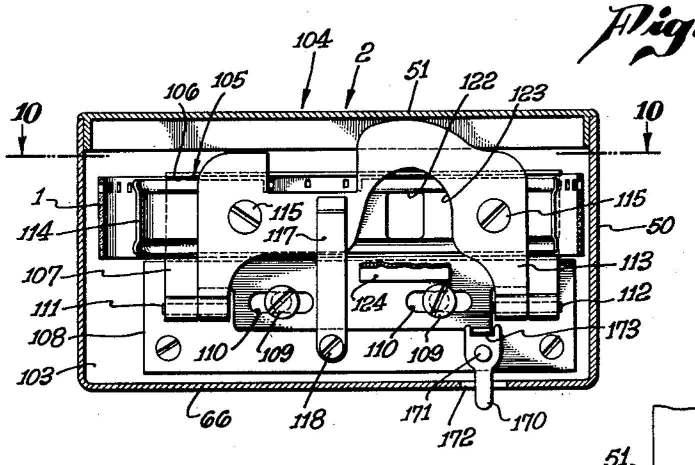
Figure 9 is a cross section taken as indicated by line 9—9 of Figure 7.

As previously described, the entire gate mechanism 14 having the aperture 122 is carried by the frame 105 which is slidably supported on the spacer 108 by the screws 109 engaging slots 110 (see Figures 7 and 9). Shifting of this mechanism longitudinally serves to position the aperture 122 in proper alignment with successive frames on the film. This adjustment is accomplished by a lever 170, pivotally secured by a pin 171 to the spacer 108 and extending through an opening 172 in the bottom 66 of the magazine 2. The lever 170 engages a lug 173 on the frame extension 107 making it possible to move the gate mechanism from outside the magazine.

When a film 1 is initially installed in a magazine 2, an attendant or service man, by means of lever 170, shifts the gate mechanism while the film is being projected to properly frame the image.

The mechanism 174 for setting the loop is shown in Figures 6, 7, 10, 11, 12 and 13 and comprises rollers 175 and 176 rotatably mounted on pins 177 and 178 which are threadedly secured to bars 179 and 180. As clearly shown in Figures 10 and 11, these bars are slidably secured to the top 51 of the magazine 2 by guide members 181 and 182. The bars 179 and 180 are joined by pivoted links 183 and 184 to the opposite ends of a lever 185 mounted intermediate its ends on a stub shaft 186 which is supported in a flanged bushing 187 secured to the magazine cover 51. An operating arm 188 is formed on the outer end of the shaft 186.

Figure 12:
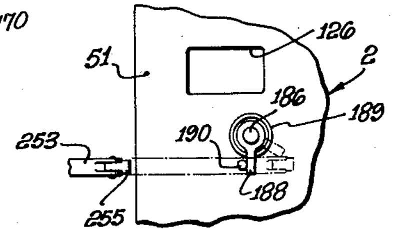
Figure 12 is a fragmentary top plan view of the magazine of Figure 6.
Figure 10:
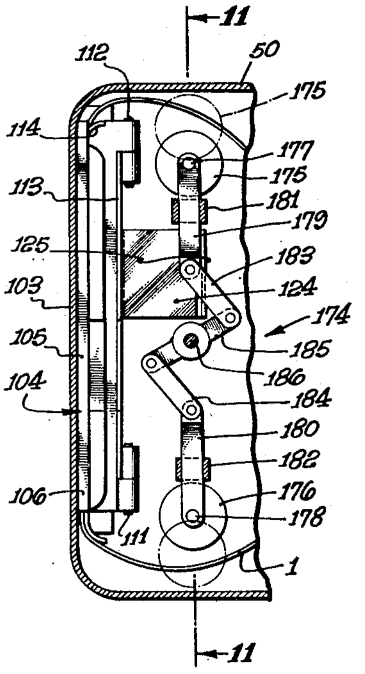
Figure 10 is a transverse section taken as indicated by line 10—10 of Figure 9.
Figure 11:
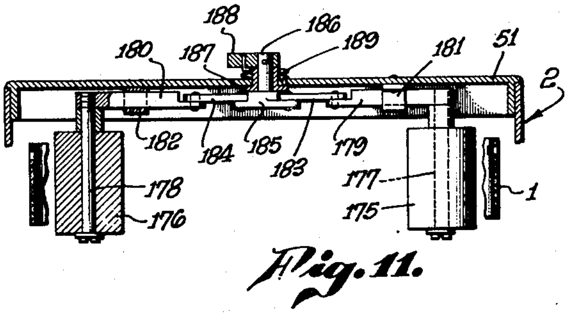
Figure 11 is a cross section taken as indicated by line 11—11 of Figure 10.
Figure 13:
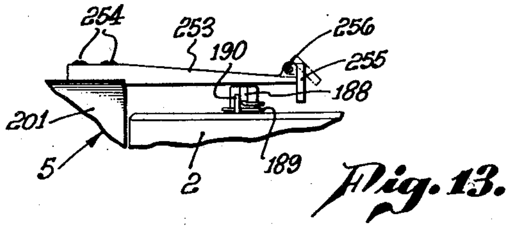
Figure 13 is a fragmentary side elevation of the structure of Figure 12.

A torsion spring 189 is connected at one end to arm 188 and its other end to the cover 51 and is so formed as to urge the arm 188 and the lever 185 in a clockwise direction, referring to Figure 10. Further movement in this direction is prevented by the engagement of the arm 188 with a stop pin 190 fixed in the cover 51 (Figures 12 and 13). In this position, the rollers 175 and 176 are out of contact with the film 1, which is the normal condition of the mechanism. However, means are provided which act just before the projection of the film commences, to engage the arm 188 and rotate it together with the lever 185 through a sufficiently large angle to move the bars 179 and 180 so that the rollers engage the film 1 and move to the dotted positions of Fig. 10. This reforms or resets the loop.

Figure 16:
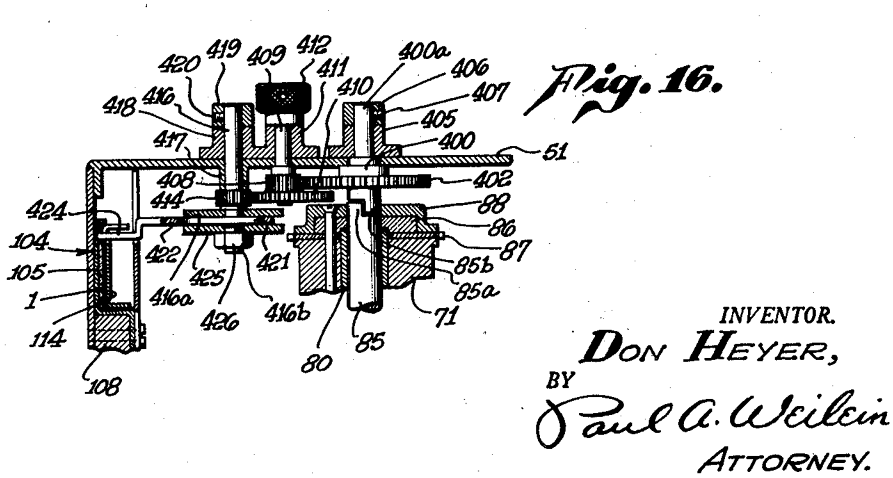
Figure 16 is a section taken as indicated by line 16—16 of Figure 15.

The claw mechanism 401 for advancing the record carrying member 1 will now be described (see Figures 15 and 16). A gear wheel 402 is secured on the stub shaft 400 and is arranged to be driven in response to rotation of the shaft 85 through coupling 85*a*—85*b*. The shaft 400 has a reduced portion 400–*a* journalled in a bearing 405 secured to the outside of the magazine cover 51, being axially restrained therein by a collar 406 secured to the outer end of the reduced portion 400–*a* by a set screw 407. The gear 402 meshes with a pinion 408 fixed on a shaft 409 to which is also fixed a gear 410, and which is rotatably supported in a bearing 411 on the cover 51 by a knurled nut 412 fixed on the shaft 409.

A drive pinion 414 mounted on the cam shaft 416 meshes with the gear 410. Bearings 417 and 418 fixed on the cover 51 support the cam shaft 416. A collar 419 fixed on the outer end of the shaft 418, as by a set screw 420, restrains the shaft axially. The shaft 416 has a cam 421 fixed on its inner end and engaging the yoke 422 of the claw member 423. This member has a claw 424 for engaging the sprocket holes of the film 1 in a well known manner and advancing the film 1 by movement of the member 423. The inner end of the shaft 416 is provided with a flange 416–*a* above the cam 421 (see Fig. 16) and a threaded extension 416–*b*. A washer 425 secured by a nut 426 on the extension 416–*b* serves to support the claw yoke 422 in position to engage the cam 421. The claw member 423 has a slotted extension 427 which engages a screw 428 to properly guide the claw member.

Rotation of the cam 421 in a counterclockwise direction, referring to Figure 15, as imparted by appropriate rotation of the shaft 85 will cause the claw member 423 to swing to the left about the pivot 428 engaging the claw 424 with a sprocket hole in the film 1. This position is shown in Figure 15. Continued movement will cause the claw 424 to move downwardly while remaining in engagement with the film 1, thus advancing the film. After about a half turn, the member 423 will be swung to the right, disengaging the claw from the film 1, and returned upwardly to its initial position for a new cycle of operations. In this way continuous rotation of the cam 421 advances the film 1 in a well known manner.

The film claw mechanism 401 is entirely supported on the magazine cover 51 and is removable therewith. Thus, the mechanism is readily accessible for inspection and repair, and the film in the magazine 2 may be readily removed and replaced. The knurled nut 412 makes it possible to so position the shaft 400 and gear 402 that the coupling 85–*a*, 85–*b* will be properly aligned to permit placement of the cover 51 on the magazine 2.

The reproducing mechanism 5 is shown in Figures 1, 2, 4, 5 and 18. As shown in Figures 1 and 4, the mechanism 5 is supported for movement in a direction parallel with the axis of the carrier 4 into reproducing position with respect to a previously positioned magazine 2, as shown in full lines (Figure 1), or away from the magazine to permit the carrier to rotate and position another magazine in reproducing position, as shown by the broken lines.

The reproducing mechanism 5 includes a generally conventional projector 43 adapted to project a visible image from the film 1 of a chosen magazine 2, and mounted in a housing 201, a sound pick up system 45 for rendering an audible program from the film 1, and carried by a bracket 203 extending from the housing 201, and a motor 205 for advancing the film.

The housing 201 is dovetailed for sliding movement at 208 to a raised horizontal table or plate 209 supported on the bottom of the cabinet 10 by spaced vertical plates or webs 210 and 211. The outer end of the housing 201 is provided with a depending arm 213 accommodated by a clearance slot 214 in the table 209 (Figure 2). Suitably attached to the inner end of the table is another depending arm 214. A pair of springs 216 are tensioned between the arms 213 and 214, and continually urge the housing 201 to the right, causing the arm 213 to engage a rotatable cam 218 (Figures 1 and 4). By rotating the cam 218 through a half revolution, the mechanism 5 is allowed to move to reproducing position under the influence of springs 216, or it is moved to retracted position against the force of the springs.

The cam 218 is rotatably mounted on a shaft 219 which is rotatably supported in bearing bosses 220 and 221 formed on the webs 210 and 211 and is in frictional driving relation with the shaft 219 by a pair of conventional slip clutches 222 (Fig. 2). The shaft 219 is connected to a small electric motor 224 supported on the web 211, by reduction gearing 225, the slip clutches 222 providing a safeguard against possibility of damage to the mechanism.

The projector 43 comprises a lamp 227, with a reflector 228, which projects a light beam through the condenser lens system 229 and from the housing 201, a conventional shutter mechanism 230 being provided to interrupt the light beam in a well understood manner. The magazine 2 has been accurately aligned with the projector 43 by means of the carrier 4, so that the light beam enters the magazine 2 through the opening 120 and the openings 121 and 122 in the gate mechanism 104, passing through the film 1 to the mirror 124, which reflects the light beam from the magazine 2 through the opening 126 onto a suitably inclined mirror 232 mounted on top of the housing 201 (see Figure 4). The mirror 232 reflects the light beam along a path above the housing 201 to an oppositely facing mirror 233, also carried by the housing 201, which in turn reflects the beam upwardly to the mirror 44 (see Fig. 1). As previously explained, the mirror 44 directs the beam to the viewing screen 40.

Since the film 1 during projection is in a horizontal position and the image thereon is also horizontal, means must be provided between the film 1 and the viewing screen 40 to rotate the image through 90° so that it will appear in a proper vertical position. Such means, indicated by 234, may be conveniently mounted on the housing 201 between the mirrors 232 and 233 and may include focusing apparatus.

The means for focusing and reversing the image may be of the type disclosed in Patent No. 2,442,564, issued June 1, 1948, entitled "Device for Producing Reversed Images." As shown in Figure 4, the means 234 comprises an exteriorly threaded barrel 237 rotatably mounted in a tubular bracket 238, whch also supports the mirror 232. A spring detent 239 engages the threads of the barrel 237 which carries the lens 240 and by axial adjustment, focuses the lens.

A tubular member 241 is telescoped within the barrel 237, and is freely rotatable but axially restrained with respect to the barrel. A prism 242 having parallel plane faces is mounted in the tube 241 which is rotated about its axis to adjust the prism 242 to correctly position the image. The outer end of the tube 241 is closed by a transparent member 243 to exclude dust.

The projector motor 205 is arranged to operate the shutter mechanism 230 in any well known manner, and also operates claw mechanism to be presently described, for advancing the record carrying member.

Provision is made so that the loop setting mechanisms 174 is actuated by movement of the reproducing mechanism 5 into operative relationship with the magazine 2 (see Figs. 1, 4, 12 and 13). For this purpose, a forwardly extending operating arm 253 is secured to the projector housing 201 by screws 254 and has a depending finger 255 pivoted to its outer end by a pin 256. As clearly shown in Figures 12 and 13, the arm 188 extends transversely of and below the path of movement of the operating arm 253, so that as this arm 253 advances, the finger 255 engages the arm 188 swinging the arm 188 together with the lever 185 in a counterclockwise direction (referring to Fig. 10) against the spring 189, and urging the rollers 175 and 176 apart to set the loop. The parts are so proportioned that at the limit of its forward movement, the finger 255 slips past the arm 188, allowing the arm 188 to be returned to its initial position by the spring 189. The projector housing remains in this position until completion of the projection cycle and then is retracted to its initial, inoperative position. Such movement has no effect on the arm 188, as the finger 255 merely swings upwardly about its pivot pin 256 and passes freely over the arm 188 as shown by the dotted lines in Figure 13.

Means are provided whereby the motor 205 also drives the film coil 162 and the claw mechanism 401. For this purpose the projector housing 201 is provided with an elongated forwardly extending hub 259 through which projects a shaft 260 carrying a bevel pinion 261. The shaft 260 is arranged to be driven, through suitable gearing (not shown) at the proper speed by the motor 205. The arrangement is such that when the projector housing 201 reaches the end of its forward movement, pinion 261 is in mesh with the driving gear 90 of the chosen magazine 2.

The optical sound system 45 (Fig. 5) comprises an exciter lamp 263 and a photo-electric cell 264 enclosed in a protective casing 265 carried by the bracket 203. This system operates in a conventional manner. The exciter lamp 263 is mounted in a socket 337 secured in the top wall 334 of the casing 265, the photo-electric cell 264 being also mounted in a socket 264–*a* in this same wall. A shield 339 is provided for the lamp 263, having a slot 340 for transmitting a narrow beam of light from the lamp 263 to a suitable lens system 266 enclosed in a barrel which is detachably supported at 341 in the casing 265. The light beam from the lamp 263, passes through the lens system 266, through the opening 146 in the film magazine 2, through the sound track on the film 1 and onto a reflecting member 267. The reflecting member 267 is mounted on a supporting arm 268 attached to the wall of the magazine 50. A cooperating reflector 269 is also mounted on the arm 268, and is positioned to receive the modulated light beam from the reflector 267. The reflector 269 transmits the light beam through the opening 147 in the wall of the magazine case 50 above the film 1, through openings 270 and 264*b* respectively in the casing 265 and photo-electric cell shield 264*c*, and onto the photo-electric cell 264, which controls a suitable sound system. The operation of such a system is well known, and need not be discussed here.

A control circuit is provided for the reproducer positioning motor 224 which, when the reproducer 5 is in its retracted or inoperative position indicated by the broken lines in Fig. 1, will cause energization of the motor 224 upon the chosen magazine 2 reaching its operating position. Means responsive to the arrival of the reproducer mechanism 5 at its forward or reproducing position is provided, for causing deenergization of the motor 224 as well as energization of the projector motor 205, the projector lamp 227 and the exciter lamp 263. This means includes the limit switch 274 mounted on the table 209 and having contacts controlled by a spring urged arm 275. When the reproducer mechanism 5 reaches its forward position a cam 276 on the housing 201 engages a roller 277 carried by the arm 275 and operates the switch 274.

A switch 280 mounted within the housing 201, shown in Figure 25, operated by the film 1 at the end of the record thereon, serves to restore all parts of the apparatus other than the magazine carrier 4, to their initial positions, and to deenergize the apparatus, pending initiation of another cycle of operations. This switch 280 is shown as comprising a spring arm 281 carrying a roller 282 at its free extremity. The switch plunger 283 is engaged by the spring arm 281 which also urges the roller 282 against an edge 284 of the film 1. For this purpose each magazine case 50 has opening 286 in its front wall for admitting the roller 282 to engage the film 1 upon arrival of the reproducing mechanism 5 in operating position. A notch or opening is provided at a suitable point in the film edge 284 and by engagement with roller 282 alters the circuit connections. Due to the inertia of the film 1 and connected parts, the film 1 continues to advance a short distance and carries the notch or opening from under the roller 282, so that such change in the circuit connections is only momentary.

Furthermore, this momentary operation of the switch 280 serves also to reenergize the projector positioning motor 224, causing movement of the reproducer 5 from its forward position. A limit switch 287 also mounted on the table 209 is provided to deenergize the motor 224 upon the reproducer reaching the end of its outward movement. The switch 287 has a spring urged arm 288 for actuating the switch contacts, carrying a roller 289 adapted to be engaged by trip dog 290 pivoted at 291 on the housing 201. A stop pin 292 restricts movement of the dog 290 about its pivot 291, so that as the housing 201 moves outwardly or to the left in Figure 4, the dog 290 by engagement with the roller 289 will depress the arm 288 and operate the switch. However, upon forward movement of the housing 201, the dog 290 being free to swing upwardly about its pivot rides over the roller 289 without operating the switch. This is obviously necessary to prevent deenergization of the motor 224 when the housing 201 starts to move forward.

The selector mechanism 6 for activating the apparatus and controlling the movement of the magazine carrier 45 will now be described, reference being had to Figures 22, 23 and 24. Only the mechanical features will be considered at this time; the electrical features will be discussed in connection with the circuit for the entire apparatus.

The mechanism 6 includes a stationarily supported dielectric plate 296 having a plurality of electrical contacts 297 disposed about the axis of rotation of a contact arm 298 and corresponding in number to the total number of programs provided in the apparatus. These contacts 297 are appropriately connected in a control circuit. The contact arm 298 is secured on a shaft 299 for rotation therewith as by a set screw 300. The selector shaft 299 is rotatably supported in a desired location, for example in a wall 310 of the cabinet 10, or at a remote point as desired, by a bushing 301 and carries an operating knob 302 as well as an indicating pointer 303 cooperating with suitable indicia 304 to indicate the program which will be reproduced for a given position of the pointer 303.

A ratchet wheel 305 is secured on the shaft 299 as by a set screw 306 and cooperates with a pawl 307 to restrain rotation of the shaft 299 and connected parts in a counterclockwise direction. The pawl 307 is pivotally mounted on a screw 308 in the wall 310 and is urged to engage the ratchet 305 by a torsion spring 309. A torsion spring 311 connected between the ratchet 305 and the wall 210 continuously urges the shaft 299 and connected parts to rotate in a counterclockwise direction.

The operator, by means of the knob 302 rotates the shaft 299 and contact arm 298 in a clockwise direction until the pointer 303 indicates a desired record. The pawl and ratchet mechanism 307, 305 retains the shaft 299, contact arm 298 etc., in this position until the reproduction of the chosen record is completed. When this occurs, the pawl 307 is caused to release the ratchet 305, and the shaft 299 together with the contact arm 298 and the pointer 303 are returned by the spring 311 to their zero position against the stop 312.

An electro-magnet 314 is arranged to move the pawl 307 to releasing position and is arranged to be energized upon the completion of reproduction of the chosen record in a manner to be presently explained. Thus, the magnet 314 is mounted in a frame 315 secured to the wall 310. An armature 316 pivoted on the frame 315, is urged away from the magnet 314 and against a stop 317 by a tension spring 318. A leaf spring 319 is interposed between the armature 316 and an extension 307–*a* of the pawl 307 (see Fig. 24).

The arrangement is such that upon energization of the electro magnet 314, the armature 316 will be swung downwardly, forcing the pawl extension 307–*a* upwardly and swinging the pawl 307 to the right against the force of the spring 309 and out of engagement with the ratchet 305. Upon deenergization of the magnet 314, the pawl 307 at once returns to engagement with the pawl 305.

It may be desired to employ as a record carrying member, a film having a plurality of sound tracks thereon instead of the conventional type film having a single sound track and a picture sequence. A record having four sound tracks is shown by way of example in Figure 17.

A slightly different arrangement of the photocell is required for use with such a record carrying member, as well as means to selectively reproduce the desired record. These features have no pertinence in reproducing the sound track from a conventional picture and sound record, and hence were not previously discussed. For this purpose, a photo-cell 346 and actuating mechanism therefor arranged as shown in Figures 18, 19, 20 and 21 are provided. Furthermore, a modified form of magazine 2 (Figures 18, 18*a*, 19, 20 and 21) must be provided for use with the modified sound pick up. Such a magazine is indicated by numeral 331 in Figures 18, 20 and 21, and is quite similar to the previously described form of magazine 2, except for slight modifications to accommodate the different pick up arrangement.

Figure 18A:
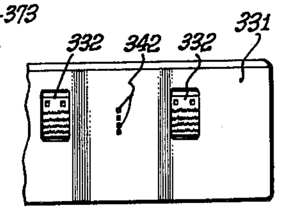

As shown in Figure 17, the record carrying member or film 332 has a plurality of longitudinally extending records or sound tracks **332–*a*, 332–*b*, 332–*c* and 332–*d***, spaced transversely across the film. As shown in Figures 18*a* and 20, the magazine 331 has a plurality of correspondingly spaced openings 342 in the raised surface 145 for passing the light beam from the source 263 to the sound tracks. Means to be shortly described are provided for restricting the light to a single sound track. The light passes through the sound track, being modulated thereby, and is received by a photo-electric cell 346 which serves to control the amplifier 46 in well understood manner and thereby actuate the speaker 41.

The photo-electric cell 346 is protected from extraneous light by an apertured shield 347 and is mounted by a socket 348 carried at one end of an arm 349 (see Fig. 21). The arm 349 is pivotally supported at its other end by a pin 350 mounted in spaced ears 351 and 352 on the casing 265.

The arrangement is such that upon the movement of a magazine 331 by carrier 4 into proper relation with the sound mechanism 45, the arm 349 is swung upwardly about its pivot 350, from its inoperative position shown by the broken lines in Figure 18, to position the photo-electric cell 346 in operative relation with the film 332, as shown in Figure 20. A suitable aperture 353 (see also Fig. 21) is provided in the bottom of the magazine 331 to permit entry of the photo cell 346 together with shield 347.

A solenoid 355 suitably attached to the side of the casing 265, is provided for actuating the arm 349 and has a headed plunger or armature 356 connected to the arm 349 by a pivoted link 357. Upon energization, the solenoid 355 swings the arm 349 upwardly against a suitable positioning stop 358 on the wall 338, of casing 265, and maintains it in this position until deenergized. Upon deenergization of the solenoid 355, arm 349 and cell 346 drop to their inactive position against stop 359. A cushioning spring 360 is provided between the head **356–*a* of armature 356 and the top of the solenoid 355 to prevent undesirable shock when the arm 349 engages the stop 359. Energization of the solenoid 355 is appropriately controlled by switch means 430 arranged for operation upon movement of the reproducer mechanism 5 into operative relation with a magazine such as 331** carrying an exclusively sound record.

Referring to Figures 26 and 27 the switch 430 may be of any suitable type including normally open and normally closed contacts and an operating arm 431. The switch 430 is shown as mounted on the reproducer mechanism 5 by being secured on a bracket 432, secured to the projector housing 201, as by screws 433. For operating the switch 430, a projection 434 such as conveniently formed by an angle clip is provided on the cover 435 of the magazine 331. The free end of the switch arm 431 is provided with a roller 436 for engaging the projection 434.

Thus, upon arrival of the reproducing mechanism 5 in reproducing relation with magizine 331, the projection 434 operates the switch 430 which is so arranged as to cut the projector lamp 227 out of circuit and cut the solenoid 355 into the circuit during operation of the sound record only. The projector lamp 227 is obviously not needed in reproducing an all sound film. When the reproducing mechanism 5 is in reproducing relation with a magazine 2 containing a picture film, the switch 430 is not operated because the magazines containing picture and sound are not provided with the projection 434, and the projector lamp 227 therefore remains in circuit.

The mechanism 345 (Fig. 20) for determining which sound track on the record 332 will be reproduced, will now be described. A thin sector 363 of opaque material, mounted on a shaft 364 rotatably supported by a bushing 365 in a wall 366, is interposed between the exciter lamp 263 and the lens system 266, serving as a light interrupter. It has several equi-angularly spaced narrow slits **262–*a*, 262–*b*, 262–*c*, and 262–*d* at different radial distances from the axis of the shaft 364 (see Figure 19). These slits cooperate with the slot 340 to direct the light beam from lamp 263 onto a particular record track in accordance with the angular position of the sector 363** about its axis.

Means are provided for positioning the sector 363 to transmit light to a desired sound track. Thus, a disc 367 having a plurality of ratchet teeth 368 corresponding in number to the desired number of positions of the sector 363 is suitably secured on the shaft 364 to rotate therewith. A torsion spring 369 interposed between the wall 366 and the disc 367 about the shaft 364, urges the sector 363 in a counterclockwise direction (referring to Fig. 19) and when in inactive position against a stop 370. In this position, the slits **364–*a*, *b*, *c*, and *d* are out of registry with the opening 340 and no light can pass the sector. An arm 372 supported for pivotal movement by the magnet frame 373 fixed on the wall 366, pivotally carries a spring urged pawl 374 for cooperating with ratchet teeth 368. Stop pins 375 and 376 serve to limit the movement of the arm 372, the arm being normally maintained with the pawl 374 against the upper stop 375 by a tension spring 377. The arm 372 forms an armature for an electro-magnet 378, which upon energization swings the arm 372 to cause the pawl 374 to engage one of the teeth 368 on the disc 367 and advance the disc and sector 363 in a clockwise direction. The movement of the arm 372 downwardly is restricted by the engagement of the pawl 374 with the lower stop pin 376, and in this position contacts 380 and 381 carried respectively by and insulated from the arm 372 and the frame 373**. The purpose of these contacts will be explained in connection with the discussion of the circuit and operation of the apparatus.

A pawl 382 pivotally mounted on a pin 383 in the wall 366 is urged to engage the teeth 368 by a torsion spring 384 (see Figure 20). This pawl has a tail or extension **382–*a* engaged by a spring arm 385 carried by an armature 386 pivotally mounted on the frame 387 of a magnet 388. Upon energization of the magnet 388, the armature 386 is swung downwardly urging the pawl 382 out of engagement with the teeth 368**.

The angular spacing of the teeth 368 corresponds to that of the light slits **363–*a*, *b*, *c*, and *d*, hence successive energizations of the magnet 378 moves the sector 363 to place the slits successively in alignment with the opening 340, pawl 382 serving to retain the sector against return movement until energization of the magnet 388**. Upon such energization, the sector returns to its initial position in which no light can be transmitted.

A switch 390 is mounted within the casing 265 for operation by movement of the sector 363. This switch comprises a stationary contact arm 391 and a movable spring contact arm 392 adapted to be engaged by a pin 393 on the sector 363. The parts are so arranged that when the sector 363 is in its initial position to prevent all passage of light, the pin 393 by engagement with arm 392 maintains the switch 390 open. As the sector 363 moves to light passing position, the arm 392 is released, allowing the switch to close.

The operation of the apparatus will now be discussed, reference being had for this purpose to Fig. 28. The electrical circuits of the apparatus are arranged to be energized from a suitable source of energy by being connected therewith at points A and B. The arm 298 of the program selector 6 is first rotated to that contact 297 corresponding to a given program. These contacts are marked I to XI in Figure 28. The magazine 331 carrying the multi-sound track record member 332 occupies a position on the carrier 4 corresponding to the number I point on the selector 6. This point corresponds to the first sound track on record carrying member 332, points II, III and IV corresponding respectively to the other sound tracks. The succeeding magazines 2, all of which carry but one program correspond respectively to points numbered V to XI on the selector 6. Operation of the selector 6 to a given point 297 serves to condition the apparatus for reproducing a record corresponding to that point energization of the apparatus by momentarily closing the push button operated switch L.

As the arm 298 successively contacts the points I, II, III and IV, coil 378 is successively energized and deenergized, causing the armature 380 to advance the light interrupter 363 in a step by step manner to position the openings 364–*a*, *b*, *c* and *d* successively in light transmitting relation to the film 332. The circuit for the coil 378 may be traced as follows: from point A, leads 501, 502, normally closed contact 503, lead 504, arm 298, lead 505, 506, 507, 508 in succession, lead 509 coil 378, leads 510, 512, 513 and 514 to point 13.

Assuming that it is desired to reproduce the program corresponding to No. I contact, arm 298 is advanced to contact the No. I point, and retained there by the previously described mechanism 305 etc. This energizes the coil 378 as just described, swinging the armature 380 down and advancing the ratchet 367 by one tooth and advancing sector 363 to align opening 364–*a* with the slot 340 for transmitting light to sound track 332–*a* on record 332 which thus becomes the number I program. This also closes contact 381.

To initiate a cycle of operations, the push-button actuated switch L is momentarily closed. This energizes the relay coil M as follows: from A, lead 515, coil M, leads 516, 517 to point B, causing contacts M1 and M2 to close. This energizes that solenoid 31 marked J, which locates the magazine carrier 4 with the number one magazine 2 in reproducing position, as follows: from point A, leads 501, 502, 518, contact 381, lead 519, coil J, leads 520, 521, 522, 523, contact M1, lead 517 to B. However, the armature J1 of the solenoid J cannot move from its initial or normal position, wherein contact N4 of the associated switch 35 is maintained closed unless or until the magazine carrier 4 is in a position corresponding to that chosen on the selector 6.

Thus, coil N is energized as follows: from point A, lead 525, contact M2, leads 526, 527, 528, 529, contact N4, leads 530, 531, coil N, leads 532, 523, contact M1 leads 517 to B. This closes contact NI energizing the selector motor 25 from A by lead 525, contact M2, leads 526, 527, 533, motor 25, lead 534, contact NI, leads 534', 523 contact M1, lead 517, to B. At this time arms Q and R of switches 274 and 287 respectively, are each in their upper position, and a holding circuit for the coil M is established from point A by lead 525, contact M2, leads 526, 535, contact R2, leads 536, 537, 515', 516, 517 to B. Contact W3 is open and contacts P3, P4 of the switch are bridged, since the reproducer mechanism 5 has not advanced to bring roller 282 into engagement with the film 1.

When the magazine carrier 4 reaches a position corresponding to that chosen on the selector 6 armature J1 drops into the appropriate hole 29 in carrier 4. This opens the contact N4 and bridges the contacts O1 and O2. Opening the contact N4 deenergizes the coil N, opening contact N1 and deenergizing the motor 25. Bridging of the contacts O1 and O2 energizes the relay P from point A by lead 525 contact M2, leads 526, 535, contact R1, lead 543, contact Q1, leads 542, 539, 538, contacts O1, O2 leads 601, 602, coil P, leads 603, 604, 522, 523, contact M1, lead 517 to B. This closes contact P1 and energizes motor 224 which moves the reproducer mechanism 5 into and out of reproducing position, as follows: from point A by lead 525, contact M2, leads 526, 535, contact R2, leads 536, 544, contact P1, lead 546, motor 224, leads 547, 604, 522, 523, contact M1, lead 517, to B. This mechanism includes the driving motor 205 for the claw mechanism 401 and the shutter 230, the projector lamp 227 and the switch 430. Motor 205 is connected at all times to leads 557 and 558. The projector lamp 227 is normally connected from at all times to leads 557 and 558. The projector lamp 227 is normally connected from lead 557 by lead 610, lamp 227, lead 611, contact 608 of switch 430 and lead 612 to lead 558. However, when a magazine carrying all sound film is in reproducing position, movement of the reproducing mechanism 5 to operative position causes switch 430 to open contact 609, as previously explained. This cuts lamp 227 out of circuit and puts solenoid 355 into circuit as follows: from lead 557 by leads 610, 613, coil 355, lead 614, contact 609, and lead 612 to lead 558.

When the reproducer mechanism 5 reaches the end of its travel into operative relation with the magazine, a cam 276 thereon swings switch arm Q down, opening contact Q1, deenergizing the coil P which opens contact P1, deenergizing the motor 224, and closing contact Q2. This establishes a circuit for the heater coil T as follows: from point A by lead 525, contact M2, leads 526, 535, contact R1, lead 543, contact Q2, 548, coil T lead 549, contact U1, leads 550, 551, 521, 522, 523, contact M1, lead 517 to B. Additionally, as mechanism 5 reaches end of travel, roller 282 of the switch 280 contacts the film closing contact W3 to permit energization of coil V and opening contacts P3 and P4. It is to be understood that the parts must be proportioned so that contacts P3, P4 are opened before contact Q3 is closed. After suitable time the bimetallic element S flexes in response to the head of the coil T, closing contact S1, energizing the coil V from point A by lead 548 and previously described connections contact S1, lead 552, coil V lead 553 to B via lead 550 and previously described connections. This causes the arm U to open contact U1 deenergizing the heater T, and to close contacts V1 and V2 to energize projector operation motor 205, and either the projector lamp 227 or the solenoid 355 depending on the position of the switch 430. The projector circuit may be traced as follows: from point A via lead 548, and previously described connections, leads 554, 555, contact V2, leads 556, 557, the projector, lead 558, contact V1, leads 550 and previously described connections to B. A holding circuit is established for coil V from A by lead 548, etc., leads 554, 555, contact V2, leads 556, 622, contact W3, lead 623 coil V, leads 553, 550, etc., to B. Also when arm U moves down a circuit for the exciter lamp 263 and amplifier is established from A by leads 548, etc., 554, 559, the lamp and the amplifier which are in parallel, leads 560, 551, 521, etc., to B.

At a suitable point on film to stop projector as desired, a slot or an opening is provided for the roller 282 of switch 280 to cause momentary opening of contact W3. This deenergizes the coil V, causing the contacts V1 and V2 to open and stopping the projector motor. This operation of switch 280 also momentarily bridges the contacts P3 and P4, energizing coil P from point A by lead 525, contact M2, leads 526, 535, contact R1, lead 543, contact Q3, lead 561, contacts P3, P4, lead 562a, coil 607, leads 562, 539, 538, contacts O1, O2, leads 601, 602, coil P, leads 603, 604, 522, 523, contact M1, lead 517, to B. Since this bridging of P3, P4 is but momentary due to the inertia of film drive, it is necessary to provide a holding relay Y including the coil 607 to maintain coil P energized until the reproducing mechanism 5 has been moved back sufficiently to close contact Q1, reestablishing the circuit for coil P via lead 542 etc., as before. When the holding coil 607 is energized, arm 606 closes contact 605 paralleling P3, P4 and maintaining the coil P energized as long as contact Q2 is closed. Also withdrawal of the reproducer mechanism 5 allows contact W3 to open and contacts P3 and P4 to close, but since the previous opening of the contact W3 in response to the aperture in the passing film deenergized the coil V and released the arm U, this second opening is of no effect. Further, such withdrawal has opened the contact Q3 so that this closing of contacts P3 and P4 is likewise of no effect.

As the mechanism 5 nears the end of its withdrawal movement, the trip 290 operates momentarily the arm R of the switch 287 to open the contacts R1 and R2 and to close the contacts R3 and R4. This momentary opening of the contacts R1 deenergizes the coil M so that contacts M1 and M2 open, which in turn deenergize the coil P and the solenoid J. Deenergization of the coil P causes contact P1 to open and deenergize the projector advancing motor 224. Deenergization of the solenoid J allows the armature J1, under the influence of its spring 33 to withdraw from aperture 29 in the carrier 4 and thus open contacts O1 and O2 and reestablish the contact N4.

The closing of contacts R3 and R4 energizes the coil X as follows: from point A, lead 563, contacts R3, R4, lead 564, coil X, leads 565, 514, to B. This opens contact 503, deenergizing coil 378 and opening contact 381 and closing contact 566. This latter contact establishes a holding circuit for coil X from point A by lead 501, 502, contact 566, leads 567, 568, contact X2 of switch 390, lead 569, coil X, leads 565, 514 to B. This contact also energizes a heater coil H as follows: from point A, leads 501, 502, contact 566, leads 567, 570, coil H, leads 571, 513, 514 to B. After an appropriate interval a bimetallic element Z flexes under the influence of the heater coil H and closes contact Z2 energizing 314 and 388 which are in parallel. These circuits may be traced as follows: from point A, leads 567, 570, contact Z2, leads 572, 573, coil 388, leads 574, 512, 513 to B and from lead 572, lead 575, coil 314, leads 576, 513 to B. This releases latches holding ratchets 305 and 367, allowing the light interrupter 363 to return to its initial position and opening contact 566, and allowing the selector arm 298 to return to its zero position. The opening of 566 deenergizes X, allowing the contact 503 to be remade, and positioning all parts for another cycle.

Consider now after completion of reproduction of the number I record, the plunger J1 is withdrawn from but remains aligned with, that hole 29 in magazine carrier 4 which corresponds to the number I recording. Suppose a reproduction of the recording is desired; the arm 298 is rotated to contact number V; as it passes points I, II, III, IV, the coil 378 is energized from A by leads 501, 502, 503, 504, arm 298, leads 505, 506, 507, and 508 in succession, lead 509, coil 378, leads 510, 512, 513, 514, to B, closing contact 381. However, solenoid J is not energized due to open contact M1, unless push button switch L is closed. Ratchet 367 and light interrupter 363 have been rotated to last position due to successive energizations of coil 378 and are retained there by pawl 382. This is the position for reproducing record number IV on multiple sound track record 332 and also sound track on picture and sound records.

Movement of the arm 298 to number V deenergizes the coil 378 and connects the solenoid K from A by leads 501, 502, 503, 504, arm 298, contact point V, lead 616, solenoid K, leads 620, 520, 521, 522, 523, to contact M1. Thus, when push button switch L is closed, the solenoid K is connected from M1, lead 517 to B, due to the closing of M1 in response to energization of the coil M. The selector motor 25 is energized and plunger K1 is urged to drop into proper hole 29 in the carrier 4 as before for properly positioning the magazine 2 corresponding to number V, after which operation of the apparatus is as previously described. However, since record number V carries a picture program, the switch 430 is not actuated and contact 608 remains closed, the projector lamp 227 thus being energized as previously discussed, and the solenoid 355 not being energized as the photo-cell 346 is not used with a picture and sound record.

I claim:

1. A support for a film coil, comprising a reel mounted for rotation about an axis, said reel having a plurality of radially extending rollers mounted for rotation about their axes and upon which an edge of the film rests, a member substantially normal to said axis supporting said reel by engagement with said rollers and thereby causing said rollers to be rotated as the reel revolves.

2. In a magazine for a coil of continuous film wherein the magazine is provided with a removable cover, a pair of reels rotatably secured within the magazine, each having a flange facing the cover and means on said flange for mounting said coil by engaging one edge thereof, and rollers rotatably supported on said cover for engaging the opposite edge of the coil; said means on said flange engaging a portion of the magazine opposite said flange.

3. A support for a coiled flexible element, including a rotatable reel, a plurality of rollers carried by said reel for contacting an edge of said element, and a member providing a surface opposed to and engaging peripheral portions of said rollers for driving said rollers as said reel rotates.

4. A support for a coiled flexible element, including a rotatable reel, a plurality of rollers carried by said reel for contacting an edge of said element, and a member providing a surface opposed to and engaging peripheral portions of said rollers for driving said rollers as said reel rotates, said rollers extending radially of said reel.

5. A support for a coiled flexible element, including a rotatable reel, a plurality of tapered rollers carried by said reel for contacting an edge of said element, and a member providing a surface opposed to and engaging peripheral portions of said rollers for driving said rollers as said reel rotates.

6. In a support for a coiled flexible element, a rotatable reel having a hub and a flange, a member on which said hub is rotatable, a plurality of tapered rollers mounted on said flange for contacting an edge of the flexible element, and a member providing a surface with which peripheral portions of the larger ends of said rollers are engaged for driving said rollers as the reel rotates.

7. In a support for a coiled flexible element, a rotatable reel having a hub and a flange, a plurality of rollers carried by said flange for contacting the edge of said element opposed to one side of said flange, and means forming a surface by contact with which on the other side of said flange said rollers are driven as the reel is rotated.

8. In a support for a coiled flexible element, a rotatable reel having a hub and a flange, a plurality of rollers carried by said flange for contacting the edge of said element opposed to one side of said flange, means forming a surface by contact with which on the other side of said flange, said rollers are driven as the reel is rotated, and a roller mounted to contact the other edge of said element.

9. In a support for a coiled flexible element, a rotatable reel having a hub and a flange, a plurality of rollers carried by said flange for contacting the edge of said element opposed to one side of said flange, means forming a surface by contact with which on the other side of said flange, said rollers are driven as the reel is rotated, and a roller mounted to contact the other edge of said element, said plurality of rollers and said last named roller being tapered and disposed with their larger ends nearer to said hub.

10. In a support for a coiled flexible element, a pair of rotatable reels, a plurality of rollers carried by at least one of said reels, said rollers providing surfaces for contacting an edge of said element, and means providing a surface frictionally engaged with said rollers for driving said rollers as said reels are rotated.

11. In a support for a coiled flexible element, a plurality of rotatable reels, a plurality of tapered rollers carried by and extending radially of said reels for contacting an edge of said element, and a member providing a surface against which peripheral portions of said rollers are frictionally engaged so as to be rotated about their axes as said reels are rotated.

12. In a magazine for a coiled flexible element, a housing having a removable cover affording access to the interior of the housing, a rotatable reel supporting said element in said housing, a plurality of rollers mounted on said reel for contact with one edge of said element, and a roller carried by said cover for contact with the other edge of said element, a wall of said housing opposite said cover contacting said rollers on said reel and driving the rollers on said reel as the reel is rotated.

13. In a magazine for a coiled flexible element, a housing having a removable cover affording access to the interior of the housing, a pair of reels for supporting said element, mounted for rotation within said housing, tapered rollers mounted on at least one of said reels so as to extend radially thereof and to contact one edge of the element, means forming a surface opposed to and frictionally engaged with peripheral portions of said rollers for driving said rollers as said reel is rotated, and a roller supported by said cover in position to contact the edge of said element opposite the edge contacted by the reel-carried rollers.

14. In a magazine for a coiled flexible element, a housing, a pair of rotatable reels mounted in said housing for supporting said coiled element, each of said reels having a hub and a flange, means operable from the exterior of said housing for driving one of said reels, the other reel being driven by said coiled flexible element, means for feeding said element from the interior of said coil thence back around the exterior of said coil, and tapered rollers mounted on the flange of one of said reels and contacting an edge of said element, said rollers having their larger ends in contact with a wall of the housing whereby said rollers will rotate as said reels are rotated.

15. A magazine for an endless, flexible record-carrying element, including a housing, rotatable reels arranged in said housing to have the major portion of said elements wound therearound as a coil, means in the housing for forming and maintaining a portion of said element as a loop extending from the inner periphery of said coil and then back to the outer periphery of said coil, means in said housing and operable from the exterior thereof for driving one of said reels, and rollers carried by at least one of said reels for contacting an edge of said element, said housing having a wall by contact with which said rollers are driven as said reels are rotated.

16. A magazine for an endless, flexible record-carrying element, including a housing, rotatable reels arranged in said housing to have the major portion of said element wound therearound as a coil, means in the housing for forming and maintaining a portion of said element as a loop extending from the inner periphery of said coil and then back to the outer periphery of said coil, means in said housing and operable from the exterior thereof for driving one of said reels, tapered rollers mounted on one of said reels so as to extend radially thereof in contact with an edge of said element, and a portion of said housing forming a surface for contacting said rollers whereby said rollers will be rotated about their axes as said one reel is rotated.

17. A magazine for a coiled flexible element comprising: a housing; a pair of rotatable reels mounted in said housing for supporting said coiled element; means operable from the exterior of said housing for driving one of said reels; the other reel being driven by said coiled flexible element; means for feeding said element from the interior of said coil thence back around the exterior of said coil; and rollers mounted on one of said reels contacting an edge of said element, said rollers being in contact with a wall of said housing whereby said rollers will rotate as the reels are rotated.

18. A magazine for a coiled flexible element having spaced perforations therealong comprising: a housing; a pair of rotatable reels mounted in said housing for supporting said coiled element; a sprocket; means connecting said sprocket to one of said reels whereby said one reel and said sprocket are rotatable about a common axis; means operable from the exterior of said housing for driving said one reel and said sprocket as a unit; the other reel being driven by said coiled element; means for feeding said element from the interior of said coil thence back around the exterior of said coil; said sprocket having teeth thereof engaged in perforations of said element; and rollers mounted on one of said reels contacting an edge of said element; said rollers contacting a wall of said housing whereby said rollers will rotate as said reels are rotated.

19. A magazine for a coiled flexible element comprising: a housing; a removable cover for said housing; a pair of rotatable reels mounted in said housing for supporting said coiled element; means operable from the exterior of the housing for driving one of said reels; means on said cover operable from the exterior of said cover for driving said one reel; the other reel being driven by said coiled flexible element; means for feeding said element from the interior of said coil thence back around the exterior of said coil; and rollers on one of said reels contacting an edge of said element; said rollers contacting a wall of said housing whereby said rollers will rotate as said reels are rotated.

20. A magazine for a coiled flexible element having spaced perforations therealong comprising: a housing; a pair of rotatable reels mounted in said housing for supporting said coiled element; a sprocket; means connecting said sprocket to one of said reels whereby said one reel and said sprocket are rotatable about a common axis; means operable from the exterior of said housing for driving said one reel and said sprocket as a unit; the other reel being driven by said coiled element; means for feeding said element from the interior of said coil thence back around the exterior of said coil; said sprocket having teeth thereof engaged in perforations of said element; a cover removably mounted on the housing; and means in said housing and on said cover respectively, operable manually from the exterior of said cover for driving said one reel and said sprocket.

References Cited in the file of this patent

UNITED STATES PATENTS

| | | |
|---|---|---|
| 1,135,846 | Rickon | Apr. 13, 1915 |
| 1,288,531 | De Vry | Dec. 24, 1918 |
| 1,615,298 | Bartlam | Jan. 25, 1927 |
| 2,032,336 | Strauss | Feb. 25, 1936 |
| 2,037,601 | Shirlow | Apr. 14, 1936 |
| 2,044,267 | Wiggins | June 16, 1936 |
| 2,214,468 | Lannerd | Sept. 10, 1940 |
| 2,238,719 | De Tartas | Apr. 15, 1941 |
| 2,272,413 | Links | Feb. 10, 1942 |
| 2,279,022 | Duskes | Apr. 7, 1942 |
| 2,378,416 | Like | June 19, 1946 |
| 2,398,639 | Heyer | Apr. 16, 1946 |
| 2,464,965 | Chemel | Mar. 22, 1949 |
| 2,474,972 | Contant et al. | July 5, 1949 |
| 2,512,724 | Like | June 27, 1950 |

FOREIGN PATENTS

| | | |
|---|---|---|
| 421,658 | France | Dec. 28, 1910 |
| 391,250 | Great Britain | Apr. 27, 1933 |
| 416,557 | Great Britain | Sept. 17, 1934 |
| 622,827 | Germany | Dec. 7, 1935 |
| 144,505 | Austria | Feb. 10, 1936 |
| 468,453 | Great Britain | July 6, 1937 |